(12) United States Patent
Yin et al.

(10) Patent No.: US 10,324,762 B2
(45) Date of Patent: Jun. 18, 2019

(54) RELIABILITY RESOURCE ALLOCATION METHOD AND APPARATUS

(71) Applicant: Huawei Technologies Co., Ltd., Shenzhen (CN)

(72) Inventors: Jie Yin, Shanghai (CN); Xiaodong Gong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 366 days.

(21) Appl. No.: 15/369,495

(22) Filed: Dec. 5, 2016

(65) Prior Publication Data

US 2017/0083374 A1 Mar. 23, 2017

Related U.S. Application Data

(63) Continuation of application No. PCT/CN2014/079269, filed on Jun. 5, 2014.

(51) Int. Cl.
*G06F 15/173* (2006.01)
*G06F 9/50* (2006.01)
(Continued)

(52) U.S. Cl.
CPC ............ *G06F 9/5027* (2013.01); *G06F 9/455* (2013.01); *H04L 41/0654* (2013.01); *H04L 41/12* (2013.01); *H04L 47/82* (2013.01)

(58) Field of Classification Search
CPC ..... G06F 9/455; H04L 41/0654; H04L 41/12; H04L 47/82
(Continued)

(56) References Cited

U.S. PATENT DOCUMENTS

2015/0331715 A1* 11/2015 Sathyanarayana ...... H04L 67/10
709/226
2017/0005935 A1* 1/2017 Tao ...................... H04L 12/6418

FOREIGN PATENT DOCUMENTS

CN 101359959 A 2/2009
CN 103428025 A 12/2013
CN 106845820 A * 6/2017

OTHER PUBLICATIONS

"Network Functions Virtualisation (NFV); Architectural Framework," ETSI GS NFV 002 V1.1.1, pp. 1-22 (Oct. 2013).
(Continued)

*Primary Examiner* — Umar Cheema
*Assistant Examiner* — Hannah S Wang
(74) *Attorney, Agent, or Firm* — Leydig, Voit & Mayer, Ltd.

(57) ABSTRACT

The present disclosure provides a reliability resource allocation method and apparatus. The method includes: receiving, by an NFVO (network functions virtualization orchestrator), a reliability requirement of a user for an application service; decomposing, by the NFVO, the reliability requirement to determine a reliability requirement of a virtual machine providing the application service; selecting, by the NFVO from a preset reliability information base according to the reliability requirement of the virtual machine, a reliability resource that meets the reliability requirement of the virtual machine; and sending, by the NFVO, the reliability resource to a VIM (virtualized infrastructure manager), so that the VIM starts the reliability resource. According to the method provided in embodiments of the present disclosure, the reliability requirement of the user for the application service can be accurately met.

12 Claims, 9 Drawing Sheets

(51) Int. Cl.
    *H04L 12/911*    (2013.01)
    *H04L 12/24*     (2006.01)
    *G06F 9/455*     (2018.01)

(58) Field of Classification Search
    USPC .......................................................... 709/226
    See application file for complete search history.

(56) References Cited

OTHER PUBLICATIONS

"Network Functions Virtualisation (NFV) Network Operator Perspectives on Industry Progress," Network Functions Virtualization-Update White Paper, Issue 1, pp. 1-16, Frankfurt, Germany (Oct. 15-17, 2013).

Zong, "Problem Statement for Reliable Virtualized Network Function (VNF) Pool draft-zong-vnfpool-problem-statement-00," Internet Draft, Informational, Network Working Group (Jul. 15, 2013).

\* cited by examiner

RELIABILITY RESOURCE ALLOCATION METHOD AND APPARATUS

CROSS-REFERENCE TO RELATED APPLICATIONS

This application is a continuation of International Application No. PCT/CN2014/079269, filed on Jun. 5, 2014, the disclosure of which is hereby incorporated by reference in its entirety.

TECHNICAL FIELD

Embodiments of the present disclosure relate to communications technologies, and in particular, to a reliability resource allocation method and apparatus.

BACKGROUND

As a cloud computing technology is becoming mature, an information technology (IT) field and a communication technology (CT) field infiltrate into each other and converge together. To rise to future competition and challenges, 13 Top operators jointly issue a white paper of network functions virtualization (NFV), so as to comply with current technology development trends of virtualization and cloud computing. FIG. 1 is an NFV architecture combined with cloud computing. A network functions virtualization infrastructure (NFVI) provides a cloud-based infrastructure layer. The infrastructure layer includes hardware resources, basic software on the hardware resources, and the like that are provided by multiple manufacturers. A virtualized network function (VNF) is a cloud-based network element application. A virtualized infrastructure manager (VIM) is in charge of managing the infrastructure layer. A VNF manager (VNFM) is in charge of managing a VNF lifecycle. An NFV orchestrator (NFVO) is in charge of managing a service lifecycle. An element management system (EMS) or a network management system (NMS) is a network management system of a conventional CT telecommunication network element. An operation support system (OSS) or a business support system (BSS) is a network management system of a communications system.

The maturity of the cloud computing technology enables increasing applications to migrate to a cloud computing platform. Therefore, reliability of application services based on the cloud computing platform faces the following two challenges. On the one hand, the cloud computing platform integrates software and hardware from different manufacturers, that is, the cloud computing platform may include one or more systems, and each system includes a hardware resource and basic software that are provided by a manufacturer. In a cloud environment, software and hardware decoupling enables an application program to be deployed on an arbitrary system. Adoptable reliability mechanisms are different on different systems (a difference of the reliability mechanisms brings a reliability difference of application services on systems). Hardware resources of each system may come from different manufacturers, and their reliability is also different. Therefore, when application programs are deployed on different systems, their reliability faces a challenge. On the other hand, increasing kinds of application programs running on the cloud computing platform also bring a challenge to the reliability of the application services.

On the cloud computing platform in the prior art, reliability resource allocation is generally based on a same hardware resource at a same infrastructure layer. A reliability mechanism configured for the hardware resource is generally provided in a qualitative manner (such as a high reliability mechanism, a medium reliability mechanism, and a low reliability mechanism). An application program running at the infrastructure layer also meets a reliability requirement of a user in the qualitative manner. That is, when a client has a reliability requirement for an application service, a reliability mechanism of a corresponding level is configured for the infrastructure layer in the prior art, so as to meet the reliability requirement of the user.

However, for an industry that quantitatively requires reliability, for example, the financial industry that imposes relatively detailed reliability requirements, it is difficult for a reliability resource allocation solution of the prior art to accurately meet the reliability requirement of the user.

SUMMARY

Embodiments of the present disclosure provide a reliability resource allocation method and apparatus, so as to resolve a technical problem that it is difficult for a reliability resource allocation solution in the prior art to accurately meet a reliability requirement of a user.

According to a first aspect, an embodiment of the present disclosure provides a reliability resource allocation method, including:

receiving, by a network functions virtualization orchestrator NFVO, a reliability requirement of a user for an application service;

decomposing, by the NFVO, the reliability requirement to determine a reliability requirement of a virtual machine providing the application service;

selecting, by the NFVO from a preset reliability information base according to the reliability requirement of the virtual machine, a reliability resource that meets the reliability requirement of the virtual machine, where the reliability information base includes a mapping relationship between at least one first reliability mechanism running on at least one first node and a first reliability capability, and the reliability resource includes a second node and a second reliability mechanism running on the second node; and sending, by the NFVO, the reliability resource to a virtualized infrastructure manager VIM, so that the VIM starts the reliability resource.

With reference to the first aspect, in a first possible implementation manner of the first aspect, before the receiving, by an NFVO, a reliability requirement of a user for an application service, the method further includes:

obtaining, by the NFVO, the at least one first reliability mechanism that can be deployed on the at least one first node and a reliability parameter of the at least one first node; and establishing, by the NFVO, the reliability information base according to the at least one first reliability mechanism that can be deployed on the at least one first node and the reliability parameter of the at least one first node.

With reference to the first possible implementation manner of the first aspect, in a second possible implementation manner of the first aspect, the establishing, by the NFVO, the reliability information base according to the at least one first reliability mechanism that can be deployed on the at least one first node and the reliability parameter of the at least one first node includes:

establishing, by the NFVO, a first model according to the reliability parameter of the at least one first node, so as to obtain a second reliability capability of the at least one first node;

establishing, by the NFVO, a second model according to the at least one first reliability mechanism that can be deployed on the at least one first node;

obtaining, by the NFVO according to the second reliability capability of the at least one first node and the second model, a first reliability capability that can be achieved by the at least one first node when running the at least one first reliability mechanism; and establishing, by the NFVO, the reliability information base according to the first reliability capability that can be achieved by the at least one first node when running the at least one first reliability mechanism.

With reference to the first possible implementation manner of the first aspect or the second possible implementation manner of the first aspect, in a third possible implementation manner of the first aspect, the obtaining, by the NFVO, the at least one first reliability mechanism that can be deployed on the at least one first node and a reliability parameter of the at least one first node includes:

receiving, by the NFVO, the at least one first reliability mechanism that can be deployed on the at least one first node and the reliability parameter of the at least one first node that are sent by the VIM, where the at least one first reliability mechanism that can be deployed on the at least one first node and the reliability parameter of the at least one first node are sent by a network functions virtualization infrastructure NFVI to the VIM.

With reference to any one of the first aspect to the third possible implementation manner of the first aspect, in a fourth possible implementation manner of the first aspect, the decomposing, by the NFVO, the reliability requirement to determine a reliability requirement of a virtual machine providing the application service includes:

decomposing, by the NFVO, the reliability requirement to determine a reliability requirement of a network element providing the application service; and decomposing, by the NFVO, the reliability requirement of the network element providing the application service to determine the reliability requirement of the virtual machine providing the application service.

With reference to the fourth possible implementation manner of the first aspect, in a fifth possible implementation manner of the first aspect, after the sending, by the NFVO, the reliability resource to a VIM, so that the VIM starts the reliability resource, the method further includes:

receiving, by the NFVO, fault information sent by the VIM, where the fault information is generated when the at least one first node runs the at least one first reliability mechanism; and updating, by the NFVO, the reliability information base according to the fault information.

With reference to any one of the first possible implementation manner of the first aspect to the fifth possible implementation manner of the first aspect, in a sixth possible implementation manner of the first aspect, the reliability parameter of the at least one first node includes at least one of: a hardware failure rate of the first node, a software defect indicator of the first node, a fault coverage rate of the first reliability mechanism, fault detection time of the first reliability mechanism, fault recovery time of the first reliability mechanism, or a fault recovery rate of the first reliability mechanism.

According to a second aspect, an embodiment of the present disclosure provides a reliability resource allocation apparatus, including:

a first receiving module, configured to receive a reliability requirement of a user for an application service;

a determining module, configured to decompose the reliability requirement to determine a reliability requirement of a virtual machine providing the application service;

a selection module, configured to select, from a preset reliability information base according to the reliability requirement of the virtual machine, a reliability resource that meets the reliability requirement of the virtual machine, where the reliability information base includes a mapping relationship between at least one first reliability mechanism running on at least one first node and a first reliability capability, and the reliability resource includes a second node and a second reliability mechanism running on the second node; and a sending module, configured to send the reliability resource to a virtualized infrastructure manager VIM, so that the VIM starts the reliability resource.

With reference to the second aspect, in a first possible implementation manner of the second aspect, the apparatus further includes:

an obtaining module, configured to: before the receiving module receives the reliability requirement of the user for the application service, obtain the at least one first reliability mechanism that can be deployed on the at least one first node and a reliability parameter of the at least one first node; and an information base establishing module, configured to establish the reliability information base according to the at least one first reliability mechanism that can be deployed on the at least one first node and the reliability parameter of the at least one first node.

With reference to the first possible implementation manner of the second aspect, in a second possible implementation manner of the second aspect, the information base establishing module includes:

a first establishing unit, configured to establish a first model according to the reliability parameter of the at least one first node, so as to obtain a second reliability capability of the at least one first node;

a second establishing unit, configured to establish a second model according to the at least one first reliability mechanism that can be deployed on the at least one first node;

an obtaining unit, configured to obtain, according to the second reliability capability of the at least one first node and the second model, a first reliability capability that can be achieved by the at least one first node when running the at least one first reliability mechanism; and a third establishing unit, configured to establish the reliability information base according to the first reliability capability that can be achieved by the at least one first node when running the at least one first reliability mechanism.

With reference to the first possible implementation manner of the second aspect or the second possible implementation manner of the second aspect, in a third possible implementation manner of the second aspect, the obtaining module is specifically configured to receive the at least one first reliability mechanism that can be deployed on the at least one first node and the reliability parameter of the at least one first node that are sent by the VIM, where the at least one first reliability mechanism that can be deployed on the at least one first node and the reliability parameter of the at least one first node are sent by a network functions virtualization infrastructure NFVI to the VIM.

With reference to any one of the second aspect to the third possible implementation manner of the second aspect, in a fourth possible implementation manner of the second aspect, the determining module includes:

a first determining unit, configured to decompose the reliability requirement to determine a reliability requirement of a network element providing the application service; and a second determining unit, configured to decompose the reliability requirement of the network element providing the application service to determine the reliability requirement of the virtual machine providing the application service.

With reference to the fourth possible implementation manner of the second aspect, in a fifth possible implementation manner of the second aspect, the apparatus further includes:

a second receiving module, configured to: after the sending module sends the reliability resource to the VIM, so that the VIM starts the reliability resource, receive fault information sent by the VIM, where the fault information is generated when the at least one first node runs the at least one first reliability mechanism; and an update module, configured to update the reliability information base according to the fault information.

With reference to any one of the first possible implementation manner of the second aspect to the fifth possible implementation manner of the second aspect, in a sixth possible implementation manner of the second aspect, the reliability parameter of the at least one first node includes at least one of: a hardware failure rate of the first node, a software defect indicator of the first node, a fault coverage rate of the first reliability mechanism, fault detection time of the first reliability mechanism, fault recovery time of the first reliability mechanism, or a fault recovery rate of the first reliability mechanism.

According to a third aspect, an embodiment of the present disclosure provides a reliability resource allocation apparatus, including:

a receiver, configured to receive a reliability requirement of a user for an application service;

a processor, configured to decompose the reliability requirement to determine a reliability requirement of a virtual machine providing the application service; and select, from a preset reliability information base according to the reliability requirement of the virtual machine, a reliability resource that meets the reliability requirement of the virtual machine, where the reliability information base includes a mapping relationship between at least one first reliability mechanism running on at least one first node and a first reliability capability, and the reliability resource includes a second node and a second reliability mechanism running on the second node; and a transmitter, configured to send the reliability resource to a virtualized infrastructure manager VIM, so that the VIM starts the reliability resource.

With reference to the third aspect, in a first possible implementation manner of the third aspect, the processor is further configured to: before the receiver receives the reliability requirement of the user for the application service, obtain the at least one first reliability mechanism that can be deployed on the at least one first node and a reliability parameter of the at least one first node; and establish the reliability information base according to the at least one first reliability mechanism that can be deployed on the at least one first node and the reliability parameter of the at least one first node.

With reference to the first possible implementation manner of the third aspect, in a second possible implementation manner of the third aspect, the processor is specifically configured to establish a first model according to the reliability parameter of the at least one first node, so as to obtain a second reliability capability of the at least one first node; establish a second model according to the at least one first reliability mechanism that can be deployed on the at least one first node; obtain, according to the second reliability capability of the at least one first node and the second model, a first reliability capability that can be achieved by the at least one first node when running the at least one first reliability mechanism; and establish the reliability information base according to the first reliability capability that can be achieved by the at least one first node when running the at least one first reliability mechanism.

With reference to the first possible implementation manner of the third aspect or the second possible implementation manner of the third aspect, in a third possible implementation manner of the third aspect, the processor is specifically configured to receive the at least one first reliability mechanism that can be deployed on the at least one first node and the reliability parameter of the at least one first node that are sent by the VIM, where the at least one first reliability mechanism that can be deployed on the at least one first node and the reliability parameter of the at least one first node are sent by a network functions virtualization infrastructure NFVI to the VIM.

With reference to any one of the third aspect to the third possible implementation manner of the third aspect, in a fourth possible implementation manner of the third aspect, the processor is specifically configured to decompose the reliability requirement to determine a reliability requirement of a network element providing the application service, and decompose the reliability requirement of the network element providing the application service to determine the reliability requirement of the virtual machine providing the application service.

With reference to the fourth possible implementation manner of the third aspect, in a fifth possible implementation manner of the third aspect, the receiver is further configured to: after the transmitter sends the reliability resource to the VIM, so that the VIM starts the reliability resource, receive fault information sent by the VIM, where the fault information is generated when the at least one first node runs the at least one first reliability mechanism; and the processor is further configured to update the reliability information base according to the fault information.

With reference to any one of the first possible implementation manner of the third aspect to the fifth possible implementation manner of the third aspect, in a sixth possible implementation manner of the third aspect, the reliability parameter of the at least one first node includes at least one of: a hardware failure rate of the first node, a software defect indicator of the first node, a fault coverage rate of the first reliability mechanism, fault detection time of the first reliability mechanism, fault recovery time of the first reliability mechanism, or a fault recovery rate of the first reliability mechanism.

According to the reliability resource allocation method and apparatus provided in the embodiments of the present disclosure, an NFVO decomposes a received reliability requirement of a user for an application service to determine a reliability requirement of each virtual machine providing the application service, and selects, from a reliability information base according to the reliability requirement of each virtual machine, a reliability resource corresponding to the reliability requirement of the virtual machine; and a VIM starts the reliability resource. According to the reliability resource allocation method provided in the embodiments of the present disclosure, the reliability information base includes a mapping relationship between different first reliability mechanisms running on first nodes at an infrastructure layer and reliability capabilities that can be achieved. That is, the NFVO evaluates in advance a reliability capability that can be achieved by hardware and a reliability capability that can be achieved when a reliability mechanism runs on the hardware. Therefore, the reliability requirement of the user is accurately met with reference to quantitative decomposition of the reliability requirement of the user.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 2:
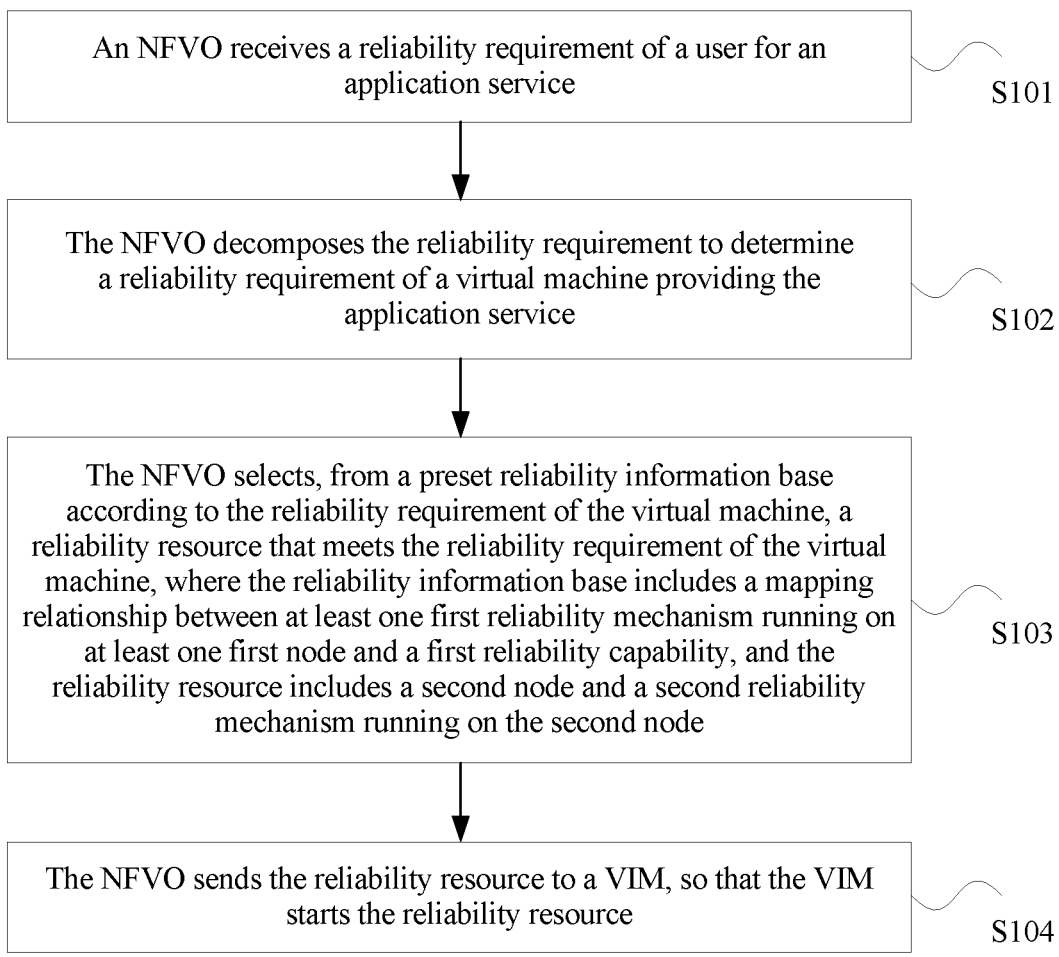
FIG. 2 is a schematic flowchart of a first embodiment of a reliability resource allocation method according to an embodiment of the present disclosure.

FIG. 2 is a schematic flowchart of a first embodiment of a reliability resource allocation method according to an embodiment of the present disclosure. As shown in FIG. 2, the method includes:

S101. An NFVO receives a reliability requirement of a user for an application service.

Optionally, the reliability requirement of the user for the application service may exist in a template form, or in a table form. The NFVO may learn, according to content included in a template or a table, that the user has a reliability requirement for the application service.

S102. The NFVO decomposes the reliability requirement to determine a reliability requirement of a virtual machine providing the application service.

Figure 1:
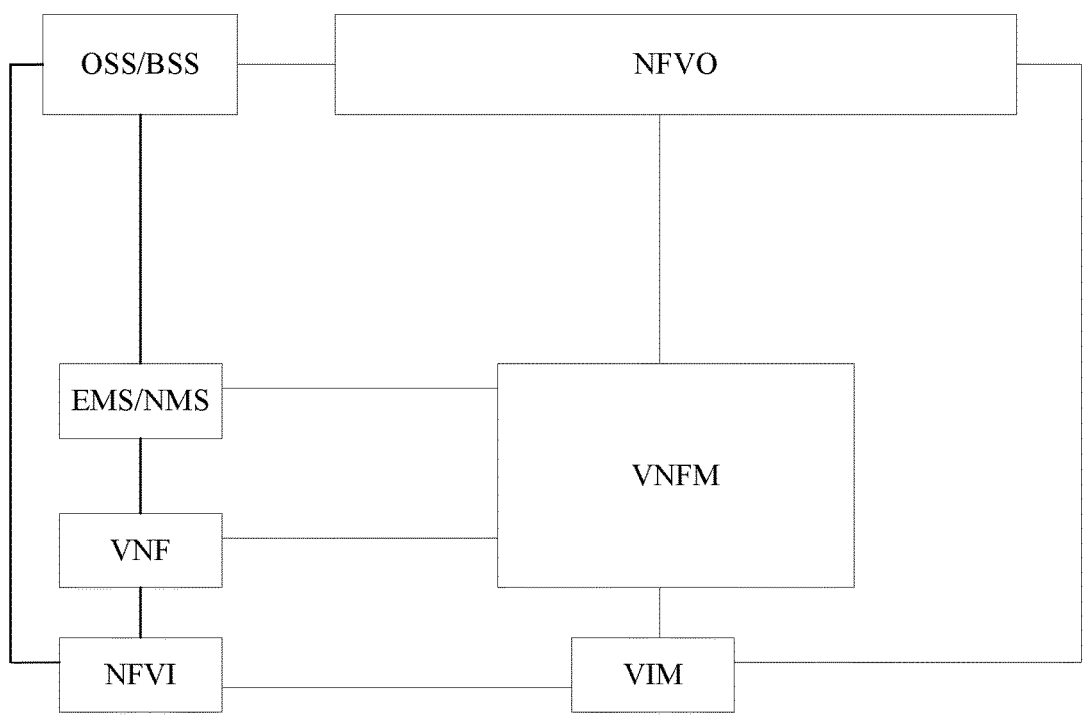
FIG. 1 is a schematic diagram of an NFV architecture combined with cloud computing according to an embodiment of the present disclosure.

Specifically, referring to the NFV architecture shown in FIG. 1, the NFVO receives the reliability requirement that is of the user for the application service and collected by an OSS/a BSS, and decomposes the reliability requirement. The application service (or a network service) may include at least one network element. For example, a voice service includes a base station, a controller, a core network, and the like. In addition, each network element may include at least one virtual machine, and the virtual machine may be equivalent to a board in a conventional network. Therefore, when decomposing the reliability requirement, the NFVO may directly decompose the reliability requirement into a reliability requirement that each virtual machine needs to meet, so as to meet the reliability requirement of the user for the application service.

S103. The NFVO selects, from a preset reliability information base according to the reliability requirement of the virtual machine, a reliability resource that meets the reliability requirement of the virtual machine, where the reliability information base includes a mapping relationship between at least one first reliability mechanism running on at least one first node and a first reliability capability, and the reliability resource includes a second node and a second reliability mechanism running on the second node.

Specifically, the NFVO selects, from the preset reliability information base according to a reliability requirement of each virtual machine, a reliability resource that meets the reliability requirement corresponding to the virtual machine, where each virtual machine corresponds to its own reliability resource herein. The reliability information base includes a mapping relationship between the at least one first reliability mechanism running on the at least one first node and the first reliability capability that can be achieved by the first node. The foregoing reliability resource includes the second node and the second reliability mechanism running on the second node. The second node herein is actually a first node that meets a reliability requirement of any virtual machine. A simple example is used for description herein.

For example, the reliability information base includes three first nodes, respectively a Hewlett-Packard server, a Microsoft server, and an IBM server. A first reliability mechanism 1 and a first reliability mechanism 2 may be deployed on the Hewlett-Packard server. The first reliability mechanism 1 may be deployed on the Microsoft server. A first reliability mechanism 3 may be deployed on the IBM server. Therefore, the reliability information base may include four mapping relationships: a first reliability capability 1 that can be achieved by the Hewlett-Packard server when running the first reliability mechanism 1, a first reliability capability 2 that can be achieved by the Hewlett-Packard server when running the first reliability mechanism 2, a first reliability capability 3 that can be achieved by the Microsoft server when running the first reliability mechanism 1, and a first reliability capability 4 that can be achieved by the IBM server when running the first reliability mechanism 3. It is assumed that in S102, the reliability requirement of the user is decomposed into reliability requirements that two virtual machines (a virtual machine 1 and a virtual machine 2) need to meet, that is, reliability capabilities that the virtual machine 1 and the virtual machine 2 need to achieve. That is, the virtual machine 1 needs to achieve the first reliability capability 1 to meet the reliability requirement of the virtual machine 1, and the virtual machine 2 needs to achieve the first reliability capability 3 to meet the reliability requirement of the virtual machine 2. The NFVO selects the Hewlett-Packard server as a second node 1 and the first reliability mechanism 1 as a second reliability mechanism 1 from the reliability information base according to the reliability requirement of the virtual machine 1. The NFVO selects the IBM server as a second node 2 and the first reliability mechanism 3 as a second reliability mechanism 2 from the reliability information base according to the reliability requirement of the virtual machine 2.

It should be noted that the foregoing first node and second node may not only include hardware, but also basic software on the hardware, such as a host machine operating system.

S104. The NFVO sends the reliability resource to a VIM, so that the VIM starts the reliability resource.

Specifically, after selecting corresponding reliability resources from the reliability information base according to the reliability requirement of the virtual machine, the NFVO sends these reliability resources to the VIM, so that the VIM starts these reliability resources. That is, the VIM may respectively deploy software, executed on each virtual machine, on a second node corresponding to these virtual machines, and enable a second reliability mechanism deployed on the second node, so as to run the second node.

In the prior art, when a user has a specific reliability requirement for an application service (it is assumed that the reliability requirement is a high reliability requirement), only a corresponding reliability mechanism (such as a high reliability mechanism) is configured for an infrastructure layer in the prior art, and a hardware reliability capability is not evaluated at the infrastructure layer. For example, when hardware reliability at the infrastructure layer is not high, even if the high reliability mechanism is configured, it is also possible that overall system reliability does not meet the reliability requirement of the user. Therefore, the reliability requirement of the user can only be met qualitatively. However, for the reliability requirement of the user, in this embodiment of the present disclosure, reliability capabilities that can be achieved by different hardware (that is, the foregoing first nodes) at the infrastructure layer when running different reliability mechanisms are evaluated, to generate a reliability information base. Then, the NFVO decomposes the reliability requirement of the user (that is, the NFVO performs quantitative decomposition processing on the reliability requirement of the user), that is, the NFVO decomposes the reliability requirement into a reliability requirement that is required by each virtual machine, and then selects, from the reliability information base, a reliability resource that meets the reliability requirement matching the virtual machine. That is, in this embodiment of the present disclosure, the reliability requirement of the user is accurately met by establishing the reliability information base with reference to quantitative decomposition of the reliability requirement of the user.

According to the reliability resource allocation method provided in this embodiment of the present disclosure, an NFVO decomposes a received reliability requirement of a user for an application service to determine a reliability requirement of each virtual machine providing the application service, and selects, from a reliability information base according to the reliability requirement of each virtual machine, a reliability resource corresponding to the reliability requirement of the virtual machine; and a VIM starts the reliability resource. According to the reliability resource allocation method provided in this embodiment of the present disclosure, the reliability information base includes a mapping relationship between different first reliability mechanisms running on first nodes at an infrastructure layer and reliability capabilities that can be achieved. That is, the NFVO evaluates in advance a reliability capability that can be achieved by hardware and a reliability capability that can be achieved when a reliability mechanism runs on the hardware. Therefore, the reliability requirement of the user is accurately met with reference to quantitative decomposition of the reliability requirement of the user.

Figure 3:
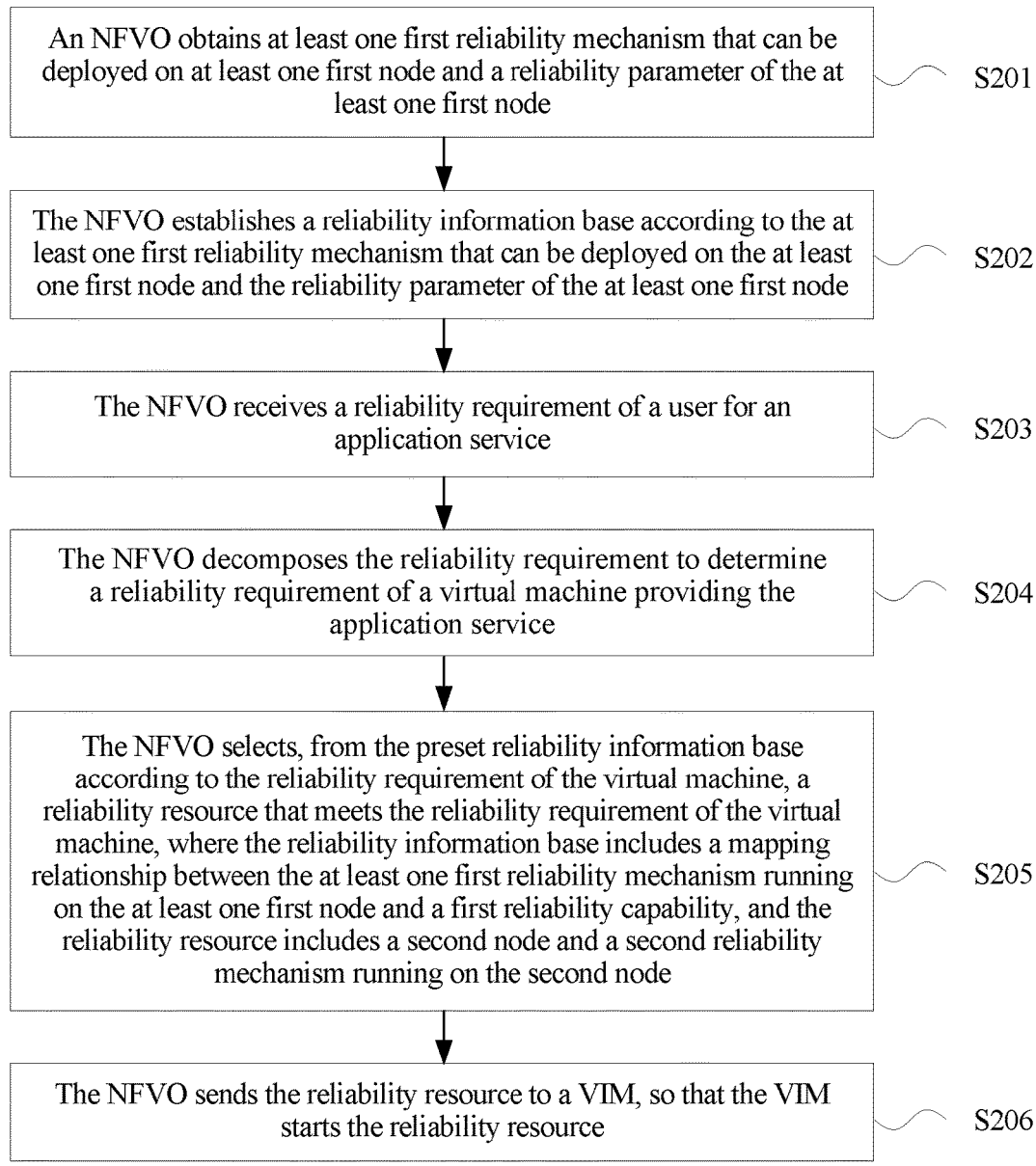
FIG. 3 is a schematic flowchart of a second embodiment of a reliability resource allocation method according to an embodiment of the present disclosure.

FIG. 3 is a schematic flowchart of a second embodiment of a reliability resource allocation method according to an embodiment of the present disclosure. This embodiment relates to a specific process in which an NFVO establishes a reliability information base and allocates a reliability resource according to a reliability requirement of a user for an application service. The method includes:

S201. An NFVO obtains the at least one first reliability mechanism that can be deployed on the at least one first node and a reliability parameter of the at least one first node.

Specifically, an NFVI provides a cloud-based infrastructure layer, and the infrastructure layer includes at least one first node. The NFVI sends at least one first reliability mechanism that can be deployed on the at least one first node and a reliability parameter of the at least one first node to a VIM, so that the VIM sends the at least one first reliability mechanism that can be deployed on the at least one first node and the reliability parameter of the at least one first node to the NFVO. The reliability parameter of the foregoing at least one first node includes at least one of: a hardware failure rate of the first node, a software defect indicator of the first node, a fault coverage rate of the first reliability mechanism, fault detection time of the first reliability mechanism, fault recovery time of the first reliability mechanism, or a fault recovery rate of the first reliability mechanism. It should be noted that if a hardware manufacturer of the first node does not provide a relevant reliability parameter, an initial reliability parameter may be set according to a laboratory test condition. In addition, in a system running process, the relevant reliability parameter may be amended according to a practical system running condition.

S202. The NFVO establishes the reliability information base according to the at least one first reliability mechanism that can be deployed on the at least one first node and the reliability parameter of the at least one first node.

Specifically, the NFVO establishes a first model according to the reliability parameter of the foregoing at least one first node, so as to obtain a second reliability capability of the at least one first node, where the second reliability capability herein refers to a reliability capability of the foregoing at least one first node not running the first reliability mechanism. The NFVO can compute second reliability capabilities of different first nodes according to the foregoing established first model, so as to implement reliability capability evaluation of hardware at the infrastructure layer. Then, the NFVO establishes a second model according to the at least one first reliability mechanism that can be deployed on the at least one first node; and computes, according to the second model and the second reliability capability of the foregoing at least one first node, a first reliability capability that can be achieved by the at least one first node when running the at least one first reliability mechanism. Finally, the NFVO establishes the reliability information base according to the first reliability capability that can be achieved by the at least one first node when running the at least one first reliability mechanism.

S203. The NFVO receives a reliability requirement of a user for an application service.

S204. The NFVO decomposes the reliability requirement to determine a reliability requirement of a virtual machine providing the application service.

Figure 4:
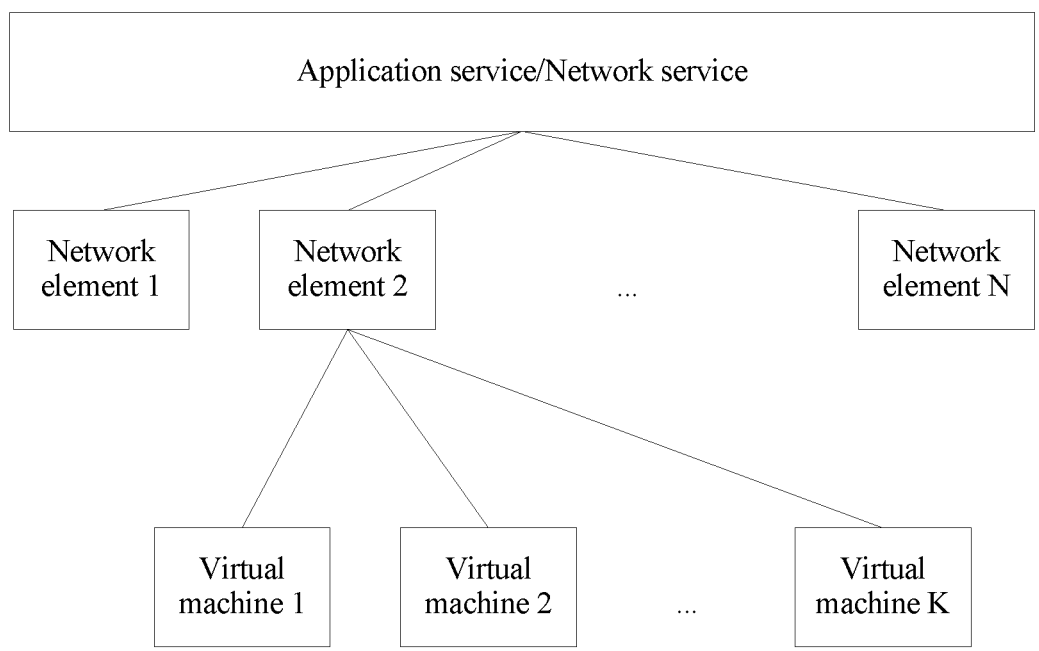
FIG. 4 is a schematic diagram of decomposition of a reliability requirement according to an embodiment of the present disclosure.

Specifically, referring to the NFV architecture combined with cloud computing shown in FIG. 1, the NFVO receives the reliability requirement that is of the user for the application service and collected by an OSS/a BSS, and decomposes the reliability requirement. The application service (or a network service) may include at least one network element. For example, a voice service includes a base station, a controller, a core network, and the like. In addition, each network element may include at least one virtual machine, and the virtual machine may be equivalent to a board in a conventional network. Therefore, when decomposing the reliability requirement, the NFVO first decomposes the reliability requirement to each network element providing the application service, that is, the NFVO determines a reliability requirement of each network element providing the foregoing application service. Then, the NFVO decomposes the reliability requirement of each network element to determine the reliability requirement of the virtual machine providing the foregoing application service. For details, refer to FIG. 4.

S205. The NFVO selects, from the preset reliability information base according to the reliability requirement of the virtual machine, a reliability resource that meets the reliability requirement of the virtual machine, where the reliability information base includes a mapping relationship between the at least one first reliability mechanism running on the at least one first node and a first reliability capability, and the reliability resource includes a second node and a second reliability mechanism running on the second node.

Refer to a specific description in the foregoing S103; details are not described herein.

S206. The NFVO sends the reliability resource to a VIM, so that the VIM starts the reliability resource.

Refer to a specific description in the foregoing S104; details are not described herein.

Figure 5:
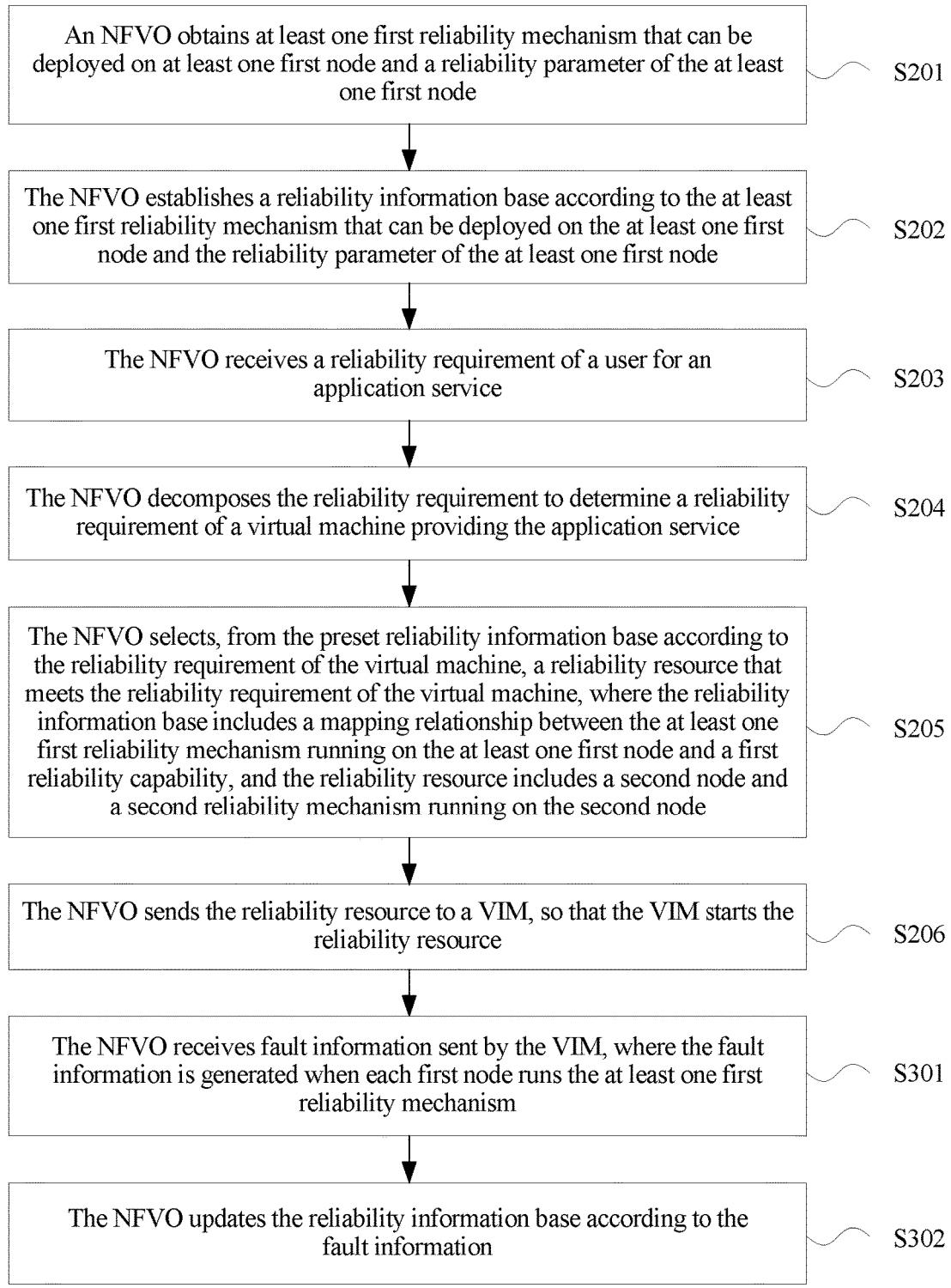
FIG. 5 is a schematic flowchart of a third embodiment of a reliability resource allocation method according to an embodiment of the present disclosure.

Optionally, as shown in FIG. 5, after the foregoing VIM starts the reliability resource, that is, after the foregoing S206, the method may further include:

S301. The NFVO receives fault information sent by the VIM, where the fault information is generated when each first node runs the at least one first reliability mechanism.

Specifically, after the foregoing VIM starts the reliability resource, the VIM monitors the fault information generated when all the first nodes run the at least one first reliability mechanism (all the first nodes herein also include the second node), and collects the fault information, for example, parameters such as a fault of which part on the first node and fault recovery time of the first node, which are sent by the VIM to the NFVO.

S302. The NFVO updates the reliability information base according to the fault information.

According to the reliability resource allocation method provided in this embodiment of the present disclosure, an NFVO decomposes a received reliability requirement of a user for an application service to determine a reliability requirement of each virtual machine providing the application service, and selects, from a reliability information base according to the reliability requirement of each virtual machine, a reliability resource corresponding to the reliability requirement of the virtual machine; and a VIM starts the reliability resource. According to the reliability resource allocation method provided in this embodiment of the present disclosure, the reliability information base includes a mapping relationship between different first reliability mechanisms running on first nodes at an infrastructure layer and reliability capabilities that can be achieved. That is, the NFVO evaluates in advance a reliability capability that can be achieved by hardware and a reliability capability that can be achieved when a reliability mechanism runs on the hardware. Therefore, the reliability requirement of the user is accurately met with reference to quantitative decomposition of the reliability requirement of the user.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program codes, such as a ROM, a RAM, a magnetic disk, or an optical disc.

Figure 6:
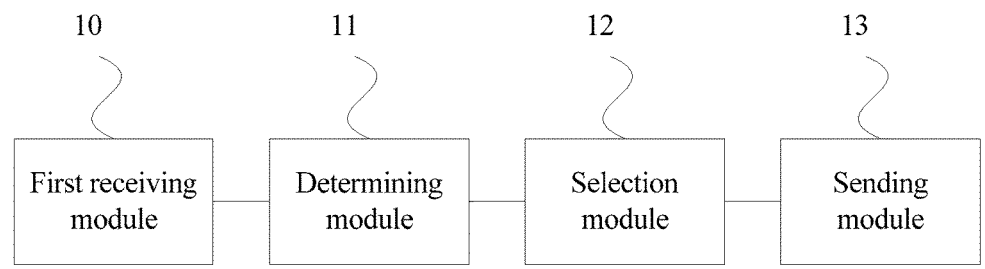
FIG. 6 is a schematic structural diagram of a first embodiment of a reliability resource allocation apparatus according to an embodiment of the present disclosure.

FIG. 6 is a schematic structural diagram of a first embodiment of a reliability resource allocation apparatus according to an embodiment of the present disclosure. The apparatus may be integrated into the foregoing NFVO, or be the NFVO. As shown in FIG. 6, the apparatus includes a first receiving module 10, a determining module 11, a selection module 12, and a sending module 13. The first receiving module 10 is configured to receive a reliability requirement of a user for an application service. The determining module 11 is configured to decompose the reliability requirement to determine a reliability requirement of a virtual machine providing the application service. The selection module 12 is configured to select, from a preset reliability information base according to the reliability requirement of the virtual machine, a reliability resource that meets the reliability requirement of the virtual machine, where the reliability information base includes a mapping relationship between at least one first reliability mechanism running on at least one first node and a first reliability capability, and the reliability resource includes a second node and a second reliability mechanism running on the second node. The sending module 13 is configured to send the reliability resource to a virtualized infrastructure manager VIM, so that the VIM starts the reliability resource.

The reliability resource allocation apparatus provided in this embodiment of the present disclosure can execute the foregoing reliability resource allocation method embodiment. Implementation principles and technical effects of the reliability resource allocation apparatus are similar to those of the reliability resource allocation method embodiment, and details are not described herein.

Figure 7:
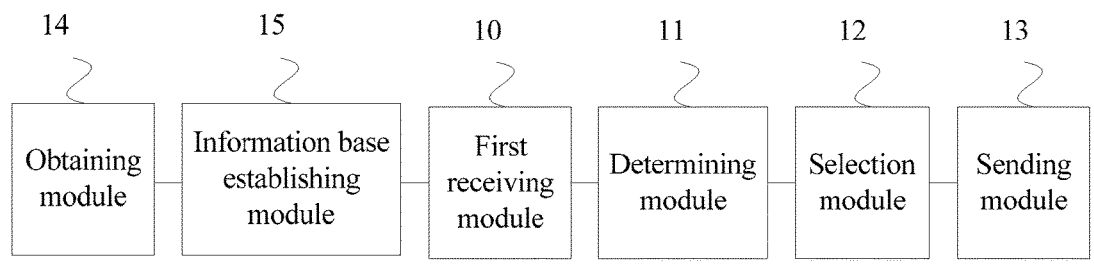
FIG. 7 is a schematic structural diagram of a second embodiment of a reliability resource allocation apparatus according to an embodiment of the present disclosure.

FIG. 7 is a schematic structural diagram of a second embodiment of a reliability resource allocation apparatus according to an embodiment of the present disclosure. Further, on a basis of the embodiment shown in FIG. 6, the foregoing apparatus further includes an obtaining module 14 and an information base establishing module 15. The obtaining module 14 is configured to: before the first receiving module 10 receives the reliability requirement of the user for the application service, obtain the at least one first reliability mechanism that can be deployed on the at least one first node and a reliability parameter of the at least one first node. The information base establishing module 15 is configured to establish the reliability information base according to the at least one first reliability mechanism that can be deployed on the at least one first node and the reliability parameter of the at least one first node.

The reliability resource allocation apparatus provided in this embodiment of the present disclosure can execute the foregoing reliability resource allocation method embodiment. Implementation principles and technical effects of the reliability resource allocation apparatus are similar to those of the reliability resource allocation method embodiment, and details are not described herein.

Figure 8:
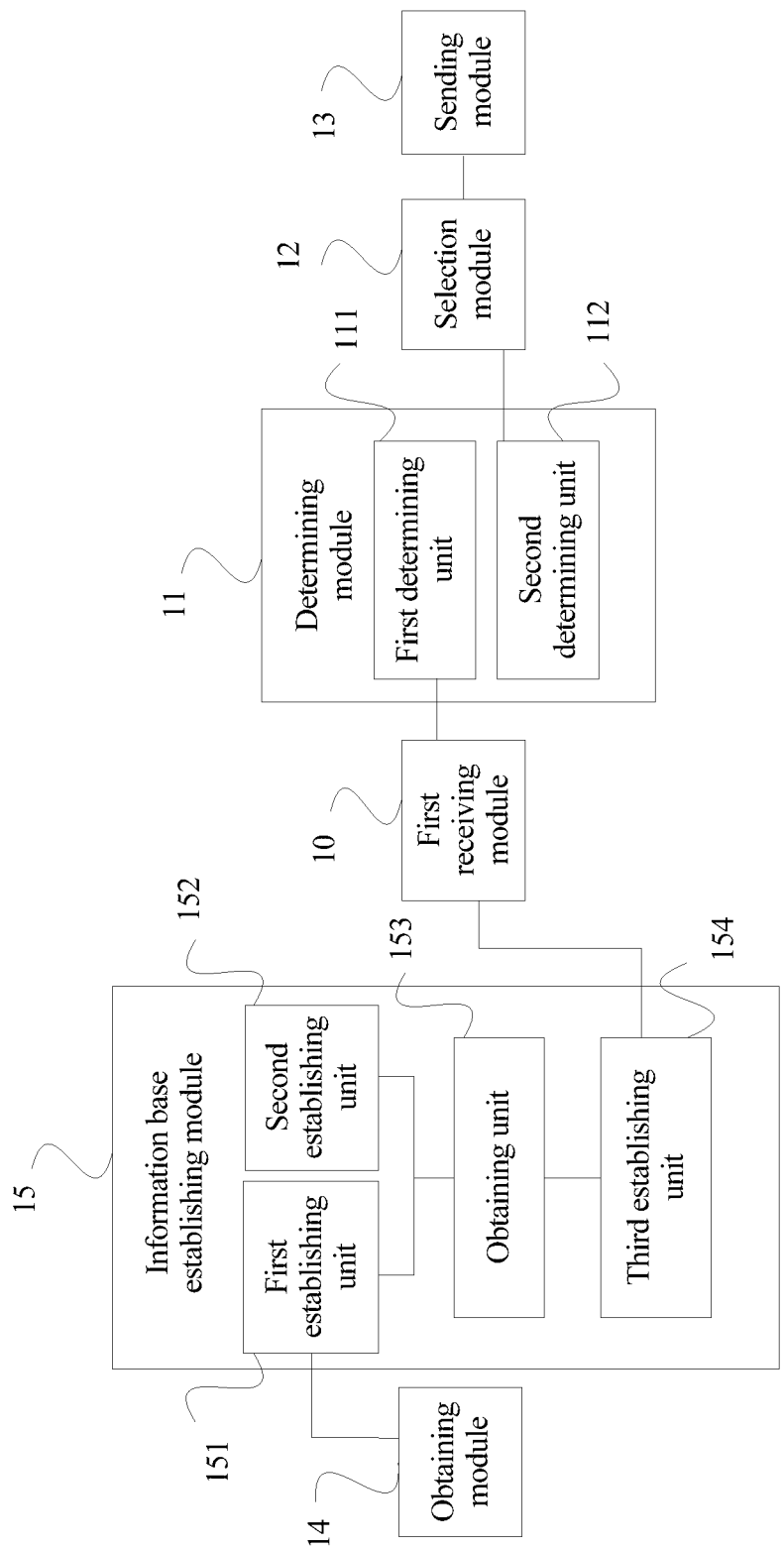
FIG. 8 is a schematic structural diagram of a third embodiment of a reliability resource allocation apparatus according to an embodiment of the present disclosure.

FIG. 8 is a schematic structural diagram of a third embodiment of a reliability resource allocation apparatus according to an embodiment of the present disclosure. Further, on a basis of the embodiment shown in FIG. 7, the foregoing information base establishing module 15 includes: a first establishing unit 151, configured to establish a first model according to the reliability parameter of the at least one first node, so as to obtain a second reliability capability of the at least one first node; a second establishing unit 152, configured to establish a second model according to the at least one first reliability mechanism that can be deployed on the at least one first node; an obtaining unit 153, configured to obtain, according to the second reliability capability of the at least one first node and the second model, a first reliability capability that can be achieved by the at least one first node when running the at least one first reliability mechanism; and a third establishing unit 154, configured to establish the reliability information base according to the first reliability capability that can be achieved by the at least one first node when running the at least one first reliability mechanism.

Further, the foregoing obtaining module 14 is specifically configured to receive the at least one first reliability mechanism that can be deployed on the at least one first node and the reliability parameter of the at least one first node that are sent by the VIM, where the at least one first reliability mechanism that can be deployed on the at least one first node and the reliability parameter of the at least one first node are sent by a network functions virtualization infrastructure NFVI to the VIM.

Still further, the foregoing determining module 11 includes: a first determining unit 111, configured to decompose the reliability requirement to determine a reliability requirement of a network element providing the application service; and a second determining unit 112, configured to decompose the reliability requirement of the network element providing the application service to determine the reliability requirement of the virtual machine providing the application service.

The reliability resource allocation apparatus provided in this embodiment of the present disclosure can execute the foregoing reliability resource allocation method embodiment. Implementation principles and technical effects of the reliability resource allocation apparatus are similar to those of the reliability resource allocation method embodiment, and details are not described herein.

Figure 9:
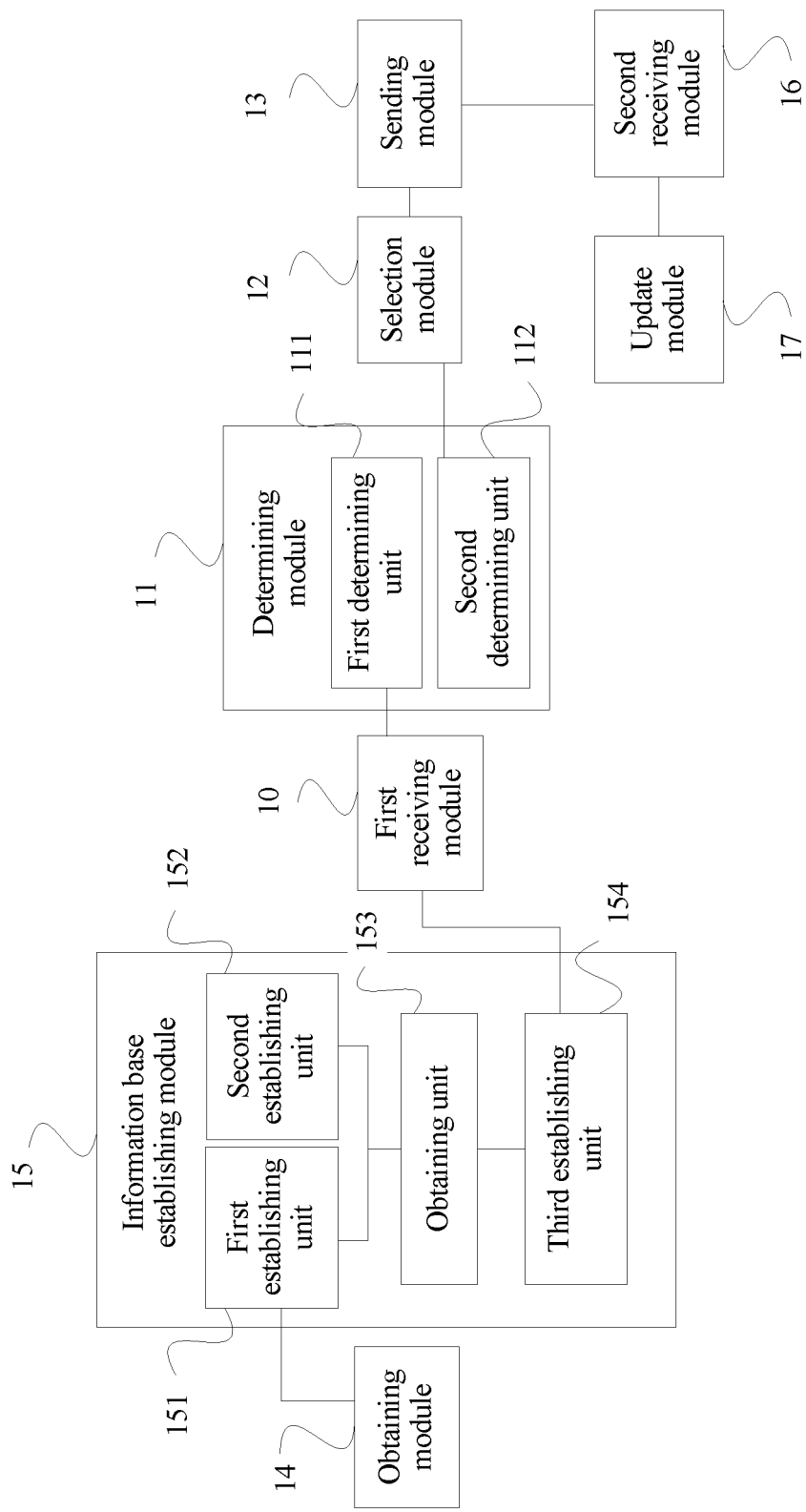
FIG. 9 is a schematic structural diagram of a fourth embodiment of a reliability resource allocation apparatus according to an embodiment of the present disclosure.

FIG. 9 is a schematic structural diagram of a fourth embodiment of a reliability resource allocation apparatus according to an embodiment of the present disclosure. Further, on a basis of the embodiment shown in FIG. 8, the foregoing apparatus further includes a second receiving module 16 and an update module 17. The second receiving module 16 is configured to: after the sending module 13 sends the reliability resource to the VIM, so that the VIM starts the reliability resource, receive fault information sent by the VIM, where the fault information is generated when the at least one first node runs the at least one first reliability mechanism; and the update module 17 is configured to update the reliability information base according to the fault information.

Further, the reliability parameter of the foregoing at least one first node includes at least one of: a hardware failure rate of the first node, a software defect indicator of the first node, a fault coverage rate of the first reliability mechanism, fault detection time of the first reliability mechanism, fault recovery time of the first reliability mechanism, or a fault recovery rate of the first reliability mechanism.

The reliability resource allocation apparatus provided in this embodiment of the present disclosure can execute the foregoing reliability resource allocation method embodiment. Implementation principles and technical effects of the reliability resource allocation apparatus are similar to those of the reliability resource allocation method embodiment, and details are not described herein.

Figure 10:
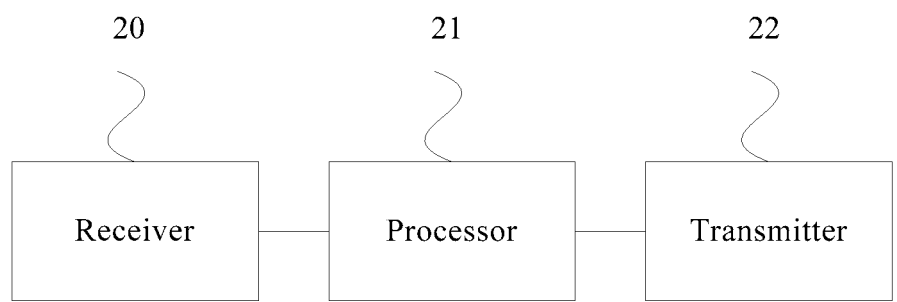
FIG. 10 is a schematic structural diagram of a fifth embodiment of a reliability resource allocation apparatus according to an embodiment of the present disclosure.

FIG. 10 is a schematic structural diagram of a fifth embodiment of a reliability resource allocation apparatus according to an embodiment of the present disclosure. The apparatus may be the foregoing NFVO. As shown in FIG. 10, the apparatus includes a receiver 20, a processor 21, and a transmitter 22. The receiver 20 is configured to receive a reliability requirement of a user for an application service. The processor 21 is configured to decompose the reliability requirement to determine a reliability requirement of a virtual machine providing the application service, and select, from a preset reliability information base according to the reliability requirement of the virtual machine, a reliability resource that meets the reliability requirement of the virtual machine, where the reliability information base includes a mapping relationship between at least one first reliability mechanism running on at least one first node and a first reliability capability, and the reliability resource includes a second node and a second reliability mechanism running on the second node. The transmitter 22 is configured to send the reliability resource to a virtualized infrastructure manager VIM, so that the VIM starts the reliability resource.

The reliability resource allocation apparatus provided in this embodiment of the present disclosure can execute the foregoing reliability resource allocation method embodiment. Implementation principles and technical effects of the reliability resource allocation apparatus are similar to those of the reliability resource allocation method embodiment, and details are not described herein.

Optionally, the foregoing processor 21 may be further configured to: before the receiver 20 receives the reliability requirement of the user for the application service, obtain the at least one first reliability mechanism that can be deployed on the at least one first node and a reliability parameter of the at least one first node, and establish the reliability information base according to the at least one first reliability mechanism that can be deployed on the at least one first node and the reliability parameter of the at least one first node.

Further, the foregoing processor 21 is specifically configured to establish a first model according to the reliability parameter of the at least one first node, so as to obtain a second reliability capability of the at least one first node; establish a second model according to the at least one first reliability mechanism that can be deployed on the at least one first node; obtain, according to the second reliability capability of the at least one first node and the second model, a first reliability capability that can be achieved by the at least one first node when running the at least one first reliability mechanism; and establish the reliability information base according to the first reliability capability that can be achieved by the at least one first node when running the at least one first reliability mechanism.

Still further, the foregoing processor 21 is specifically configured to receive the at least one first reliability mechanism that can be deployed on the at least one first node and the reliability parameter of the at least one first node that are sent by the VIM, where the at least one first reliability mechanism that can be deployed on the at least one first node and the reliability parameter of the at least one first node are sent by a network functions virtualization infrastructure NFVI to the VIM.

Still further, the foregoing processor 21 is specifically configured to decompose the reliability requirement to determine a reliability requirement of a network element providing the application service, and decompose the reliability requirement of the network element providing the application service to determine the reliability requirement of the virtual machine providing the application service.

Optionally, the foregoing receiver 20 may be further configured to: after the transmitter 22 sends the reliability resource to the VIM, so that the VIM starts the reliability resource, receive fault information sent by the VIM, where the fault information is generated when the at least one first node runs the at least one first reliability mechanism. The foregoing processor 21 may be further configured to update the reliability information base according to the fault information.

Further, the reliability parameter of the foregoing at least one first node includes at least one of: a hardware failure rate of the first node, a software defect indicator of the first node, a fault coverage rate of the first reliability mechanism, fault detection time of the first reliability mechanism, fault recovery time of the first reliability mechanism, or a fault recovery rate of the first reliability mechanism.

The reliability resource allocation apparatus provided in this embodiment of the present disclosure can execute the foregoing reliability resource allocation method embodiment. Implementation principles and technical effects of the reliability resource allocation apparatus are similar to those of the reliability resource allocation method embodiment, and details are not described herein.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A reliability resource allocation method, comprising:
   establishing, by a network functions virtualization orchestrator computing device (NFVO), a first model according to a reliability parameter of at least one first node, so as to obtain a second reliability capability of the at least one first node;
   establishing, by the NFVO, a second model according to at least one first reliability mechanism that is capable of being deployed on the at least one first node;
   obtaining, by the NFVO according to the second reliability capability of the at least one first node and the second model, a first reliability capability that is capable of being achieved by the at least one first node when running the at least one first reliability mechanism;
   establishing, by the NFVO, a reliability information base according to the first reliability capability that is capable of being achieved by the at least one first node when running the at least one first reliability mechanism;
   receiving, by the NFVO, a reliability requirement of a user for an application service;
   decomposing, by the NFVO, the reliability requirement to determine a reliability requirement of a virtual machine providing the application service;
   selecting, by the NFVO from the reliability information base according to the reliability requirement of the virtual machine, a reliability resource that meets the reliability requirement of the virtual machine, wherein the reliability information base comprises a mapping relationship between the at least one first reliability mechanism running on the at least one first node and the first reliability capability, and the reliability resource comprises a second node and a second reliability mechanism running on the second node; and
   sending, by the NFVO, the reliability resource to a virtualized infrastructure manager (VIM), so that the VIM starts the reliability resource.

2. The method according to claim 1, wherein before the receiving, by the NFVO, the reliability requirement of the user for the application service, the method further comprises:
   obtaining, by the NFVO, the at least one first reliability mechanism that is capable of being deployed on the at least one first node and the reliability parameter of the at least one first node.

3. The method according to claim 2, wherein the obtaining, by the NFVO, the at least one first reliability mechanism that is capable of being deployed on the at least one first node and the reliability parameter of the at least one first node comprises:
   receiving, by the NFVO, the at least one first reliability mechanism that is capable of being deployed on the at least one first node and the reliability parameter of the at least one first node from the VIM, wherein the at least one first reliability mechanism that is capable of being deployed on the at least one first node and the reliability parameter of the at least one first node are sent by a network functions virtualization infrastructure (NFVI) to the VIM.

4. The method according to claim 1, wherein the decomposing, by the NFVO, the reliability requirement to determine the reliability requirement of the virtual machine providing the application service comprises:
   decomposing, by the NFVO, the reliability requirement to determine a reliability requirement of a network element providing the application service; and
   decomposing, by the NFVO, the reliability requirement of the network element providing the application service to determine the reliability requirement of the virtual machine providing the application service.

5. The method according to claim 4, wherein after the sending, by the NFVO, the reliability resource to the VIM, so that the VIM starts the reliability resource, the method further comprises:
   receiving, by the NFVO, fault information sent by the VIM, wherein the fault information is generated when the at least one first node runs the at least one first reliability mechanism; and updating, by the NFVO, the reliability information base according to the fault information.

6. The method according to claim 2, wherein the reliability parameter of the at least one first node comprises at least one of: a hardware failure rate of the first node, a software defect indicator of the first node, a fault coverage rate of the first reliability mechanism, fault detection time of the first reliability mechanism, fault recovery time of the first reliability mechanism, or a fault recovery rate of the first reliability mechanism.

7. An apparatus, comprising:
a receiver;
a processor; and
a transmitter,
wherein the apparatus is a network functions virtualization orchestrator computing device (NFVO);
wherein the processor is configured to:
establish a first model according to a reliability parameter of at least one first node, so as to obtain a second reliability capability of the at least one first node;
establish a second model according to at least one first reliability mechanism that is capable of being deployed on the at least one first node;
obtain, according to the second reliability capability of the at least one first node and the second model, a first reliability capability that is capable of being achieved by the at least one first node when running the at least one first reliability mechanism;
establish a reliability information base according to the first reliability capability that is capable of being achieved by the at least one first node when running the at least one first reliability mechanism;
wherein the receiver is configured to receive a reliability requirement of a user for an application service;
wherein the processor is configured to decompose the reliability requirement to determine a reliability requirement of a virtual machine providing the application service; and select, from a preset reliability information base according to the reliability requirement of the virtual machine, a reliability resource that meets the reliability requirement of the virtual machine, wherein the reliability information base comprises a mapping relationship between at least one first reliability mechanism running on at least one first node and a first reliability capability, and the reliability resource comprises a second node and a second reliability mechanism running on the second node; and wherein the transmitter is configured to send the reliability resource to a virtualized infrastructure manager (VIM), so that the VIM starts the reliability resource.

8. The apparatus according to claim 7, wherein the processor is further configured to:
before the receiver receives the reliability requirement of the user for the application service, obtain the at least one first reliability mechanism that is capable of being deployed on the at least one first node and a reliability parameter of the at least one first node.

9. The apparatus according to claim 8, wherein the processor is further configured to:
receive the at least one first reliability mechanism that is capable of being deployed on the at least one first node and the reliability parameter of the at least one first node that are sent by from the VIM, wherein the at least one first reliability mechanism that is capable of being deployed on the at least one first node and the reliability parameter of the at least one first node are sent by a network functions virtualization infrastructure NFVI to the VIM.

10. The apparatus according to claim 7, wherein the processor is further configured to:
decompose the reliability requirement to determine a reliability requirement of a network element providing the application service; and
decompose the reliability requirement of the network element providing the application service to determine the reliability requirement of the virtual machine providing the application service.

11. The apparatus according to claim 10,
wherein the receiver is further configured to: after the transmitter sends the reliability resource to the VIM, so that the VIM starts the reliability resource, receive fault information sent by the VIM, wherein the fault information is generated when the at least one first node runs the at least one first reliability mechanism; and
the processor is further configured to update the reliability information base according to the fault information.

12. The apparatus according to claim 8, wherein the reliability parameter of the at least one first node comprises at least one of: a hardware failure rate of the first node, a software defect indicator of the first node, a fault coverage rate of the first reliability mechanism, fault detection time of the first reliability mechanism, fault recovery time of the first reliability mechanism, or a fault recovery rate of the first reliability mechanism.

* * * * *